United States Patent
Lichtberger

(10) Patent No.: US 9,518,845 B2
(45) Date of Patent: Dec. 13, 2016

(54) DEVICE FOR SURVEYING TRACKS

(71) Applicant: System 7—Railsupport GmbH, Vienna (AT)

(72) Inventor: Bernhard Lichtberger, Pregarten (AT)

(73) Assignee: System 7-Railsupport GmbH, Vienna (AT)

( * ) Notice: Subject to any disclaimer, the term of this patent is extended or adjusted under 35 U.S.C. 154(b) by 0 days.

(21) Appl. No.: 14/750,966

(22) Filed: Jun. 25, 2015

(65) Prior Publication Data

US 2015/0377653 A1   Dec. 31, 2015

(30) Foreign Application Priority Data

Jun. 27, 2014   (EP) ..................... 14174674

(51) Int. Cl.
*G01N 21/00* (2006.01)
*G01D 5/347* (2006.01)
(Continued)

(52) U.S. Cl.
CPC ............... *G01D 5/347* (2013.01); *E01B 35/00* (2013.01); *G01B 11/002* (2013.01);
(Continued)

(58) Field of Classification Search
CPC .......... Y10S 33/21; E01B 35/00; E01B 27/16; G01D 5/347; G01C 2009/066; G01B 11/002
See application file for complete search history.

(56) References Cited

U.S. PATENT DOCUMENTS 3,107,168 A   11/1963   Hogan et al.
4,155,176 A   5/1979   Goell et al.
(Continued)

FOREIGN PATENT DOCUMENTS

DE   9308435 U1   12/1993
DE   10 337 976 A1   4/2004
(Continued)

OTHER PUBLICATIONS

Espacenet English language abstract of DE 10 337 976 A1, published Apr. 1, 2004.
(Continued)

*Primary Examiner* — Kara E Geisel
*Assistant Examiner* — Maurice Smith
(74) *Attorney, Agent, or Firm* — Tiajoloff & Kelly LLP

(57) ABSTRACT

A device is proposed for measuring tracks, in particular for track laying machines, having two outer, one front and one rear, track-traveling measurement carriages (15, 21) and a middle track-traveling measurement carriage (22) arranged in between. To enable advantageous measurements, it is proposed that at least one position encoder (14, 20) pointing toward the middle measurement carriage (22) is associated with each of the outer measurement carriages (15,21), and at least two optical sensors (16, 17), in particular cameras, are arranged on the middle measurement carriage (22) on an optical axis (34) such that at least one optical sensor is oriented toward the rear measurement carriage (15) and at least one other optical sensor is oriented toward the front measurement carriage (21).

14 Claims, 4 Drawing Sheets

Figure 3:
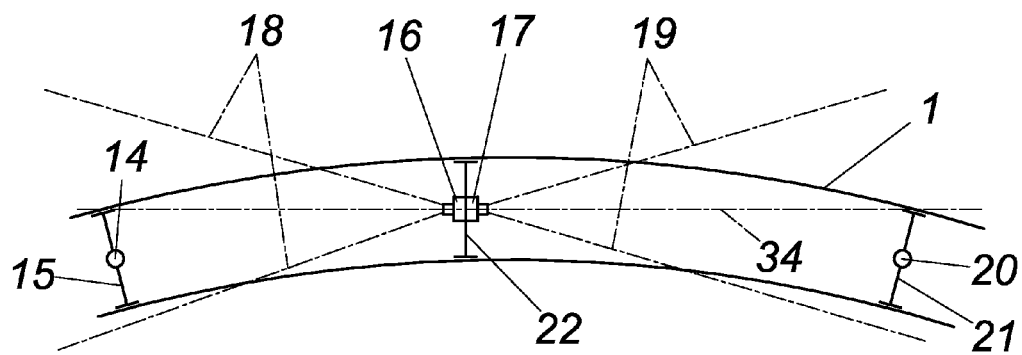

(51) Int. Cl.
*E01B 35/00* (2006.01)
*G01B 11/06* (2006.01)
*G01C 9/06* (2006.01)
*G01B 11/27* (2006.01)
*G01B 11/00* (2006.01)
*E01B 27/16* (2006.01)

(52) U.S. Cl.
CPC ........ *G01B 11/0608* (2013.01); *G01B 11/272* (2013.01); *G01C 9/06* (2013.01); *E01B 27/16* (2013.01); *G01C 2009/066* (2013.01)

(56) References Cited

U.S. PATENT DOCUMENTS

| | | | | |
|---|---|---|---|---|
| 5,203,089 | A | * | 4/1993 | Trefouel ................ G01B 11/14 33/1 Q |
| 5,301,548 | A | | 4/1994 | Theurer |
| 5,598,782 | A | * | 2/1997 | Wiseman ................ E01B 35/00 104/2 |
| 2007/0213926 | A1 | * | 9/2007 | Jager ....................... E01B 35/00 701/33.1 |

FOREIGN PATENT DOCUMENTS

| | | |
|---|---|---|
| EP | 0135610 A1 | 4/1985 |
| EP | 0520342 | 12/1992 |
| GB | 2268021 A | 6/1993 |

OTHER PUBLICATIONS

Espacenet English language abstract of EP 0 135 610 A1, published Apr. 3, 1985.

\* cited by examiner

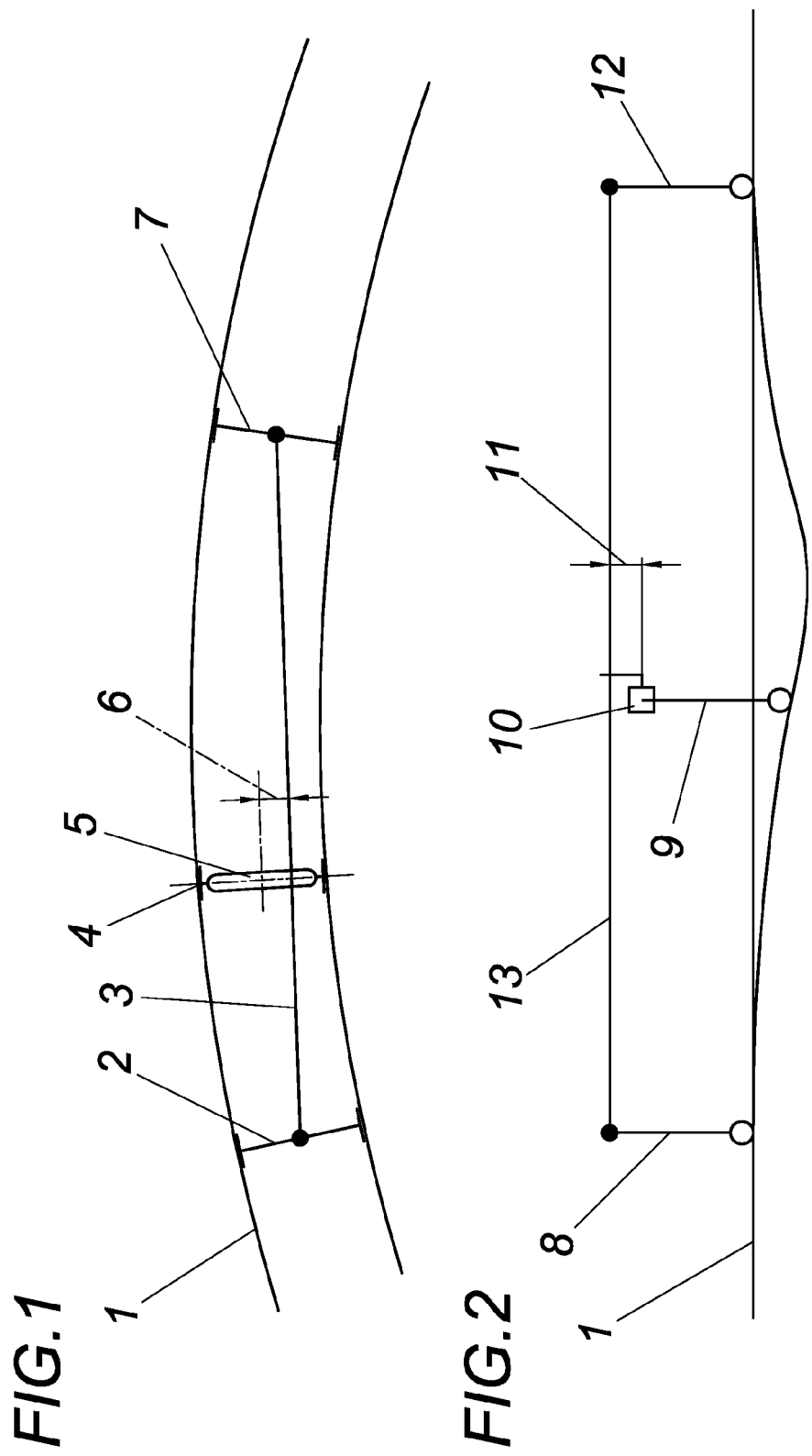

DEVICE FOR SURVEYING TRACKS

The invention relates to a device for measuring tracks, in particular for track laying machines, having two outer, one front and one rear, track-traveling measurement carriages, and one middle track-traveling measurement carriage arranged in between.

Such optical measuring systems and, in consequence, control systems for track tamping machines, are used to capture the actual (lateral) location of a track and the actual vertical location of a track simultaneously. For this purpose, three measurement carriages are guided on the track on a track tamping machine according to the prior art. Measurement systems which use steel cables are typical (DE 10337976 A). A steel cable is stretched between the front and the rear measurement carriages for the measurement. The middle carriage carries a sensor which measures the deflection of the cable. Since, in track tamping machines, tamping assemblies required for compacting the track are also located in the vicinity of the sensor, the cable is often in the way in tight curves. In order that the tamping assembly does not come into conflict with the cable, the cables are frequently laterally deflected mechanically at the outer tension points. The measurement error thus resulting is electronically compensated for.

For the measurement of the vertical location of the tracks, so-called leveling cables are stretched over both rails. The two measurement points above the rails are usually sampled via angle encoders. The leveling cables must be arranged on top, since the tamping assemblies and the chassis of the tamping machine are in the way in the lower region. These leveling cables are drawn up into the cabins of the tamping assemblies, wherein they restrict the free mobility of the personnel in the machine. Steel cables vibrate (compaction frequencies are typically at 35 Hz) and sag depending on the cable tension force and the intrinsic weight, which results in inaccuracies in the measurement. During the transport of the machine, the cables must be relaxed, since the measurement carriages are moved into the locking position. These cables are often damaged during transport or they become tangled during the stretching operation. The drifting of the leveling cables in the track curves in the camber of the track results in further system errors, which must be compensated for by computer (so-called sinking amount). The distance meters used must be very smooth running and must scan with little force, so as not to corrupt the measurement result. The plays of the drivers which are hooked in the steel cables ensure further inaccuracies.

The invention is therefore based on the object of providing a device, in particular an optical measurement and control unit, of the type mentioned at the outset, which avoids the disadvantages of the steel cable measuring units and ensures higher measurement accuracies, more universal usage possibilities, and less susceptibility to malfunction.

The invention achieves the stated object in that a position encoder pointing toward the middle measurement carriage is associated with each of the outer measurement carriages, and at least two optical sensors, in particular cameras, are arranged on an optical axis on the middle measurement carriage such that at least one optical sensor is oriented toward the rear measurement carriage and at least one other optical sensor is oriented toward the front measurement carriage.

The front and rear of the measurement carriages are equipped according to the invention with position encoders, in particular with light facilities or the like, which emit or display an optical pattern. Two optical sensors arranged on an optical axis are associated with the middle measurement carriage located in between, wherein one sensor is oriented toward the front and the other is oriented toward the rear position encoder, or measurement carriage, respectively. Via the geometrically known distances of the measurement carriages to one another and the imaging scale of the optical sensors, the position of the position encoders can be ascertained on the sensor surface of a camera, for example, by means of conventional image analysis programs, and the actual position of the front and the rear measurement carriages in the track with respect to height and lateral location can be calculated therefrom. A track laying machine, for example, a tamping machine for lifting and orienting the track in a setpoint position, can then be controlled and regulated accordingly by comparing the measured and calculated actual positions to the setpoint positions of the track.

It is particularly advantageous if two digital cameras or PSD cameras, specifically optical position sensors, are positioned, in particular centrally, on the middle measurement carriage and lie on an optical axis such that one camera is oriented forward and the other to the rear. Optical position sensors are sensors which can measure the one-dimensional or two-dimensional position of light spots. Such sensors can be classified into two classes: on the one hand, there are analog sensors, for example, position-sensitive diodes (PSD), which supply linear (continuous) position information and, on the other hand, there are discrete digital sensors, for example, CCD cameras, the surface of which is structured in a grid and which provide a discrete item of location information. CCD cameras for this invention are to have a size of at least 4 megapixels in this case.

According to one advantageous refinement of the invention, at least one position encoder, which in turn comprises at least one position light in each case, is associated with each of the front and the rear measurement carriages. Preferably, multiple position lights are combined in a specific geometric arrangement and size to form a lighting unit in each case, to simplify an analysis of the images. One embodiment of the invention provides that multiple light sources (as incandescent lamps or high-power LEDs) are constructed in a geometrically analyzable form and optionally illuminating in various color tones. The position encoder can optionally also be a reflector which can be irradiated using a light source. The reflector (strip) preferably also has a defined geometric shape.

If the measurement carriages are deflected laterally in the curve and with respect to height in the vertical location, the cameras then record corresponding images. The real position of the measurement carriages can be back calculated via the imaging scale of the cameras, and therefore the position of the cameras can be calculated in relation thereto. If the field of vision of the cameras is not sufficient in narrow track radii, it is proposed that the lighting units, or reflectors, be arranged on a transverse displacement unit having displacement position capture. The position lights can thereby be displaced laterally into the field of vision of the cameras with the aid of a mechanical adjustment unit. The adjustment distance can be measured via the adjustment encoder. This adjustment distance can be taken into consideration in the computer analysis.

In order that the images of the position lights or reflectors are determinable particularly well, the background image can be subtracted. For this purpose, the light-emitting position encoders and the cameras are controlled such that an image having activated position lights (reflectors) and thereafter one having deactivated position lights (reflectors) are recorded and these are subtracted from one another. The background image and possible display errors are therefore calculated out.

The lights can be embodied as illuminating in various colors. The light colors of the position lights can also be switchable using a control unit. The coloring of the individual light elements can also be embodied as changing from image recording to image recording (multicolored LEDs). Advantages result in the image analysis and possible plausibility checks. Since the operating speed of tamping machines, for example, is very slow (at most 2.5 km/h), it can be presumed that the two recorded images are practically identical with regard to the background. If the position lights are arranged in a cross shape, the transverse inclination of the outer measurement carriages in relation to that of the camera measurement carriage can then be calculated from the image data. If the camera measurement carriage is equipped with an absolute transverse inclination meter (pendulum, inclinometer, or the like), the absolute inclinations of the outer measurement carriages can also be calculated. In the case of tamping machines, these inclinations are measured via a pendulum and used to control the machine. The transverse inclination does not have to be measured on the camera carriage, the measurement can also be performed on one of the outer measurement carriages. In the case of known absolute inclination of one of the measurement carriages, the inclinations of the other measurement carriages can be back calculated via the inclination angle ascertained using the camera. The orientation and lifting procedures of a tamping machine operate at a time constant in the range between 0.3 and 0.5 seconds, an image recording rate of 50 Hz is thus sufficient. The middle of the optical cross and the inclination of the cross in the track transverse direction of the camera image can be specified in coordinates and angles via conventional image analysis software.

The measurement systems of tamping machines must be calibrated from time to time because of mechanical wear of the measurement wheels and other influencing variables. The function of the measurement system would ideally always be checked before beginning an operating phase. Conventional measurement systems having steel cables are generally equipped with analog circuits, which require a complex calibration—an automated simple and rapid check of the measurement system before beginning work is therefore practically not possible. In the embodiment according to the invention, in the case of an embodiment having multiple position lights, these lights can be used for calibrating the imaging scale. Since the distances and the arrangement of the position lights are defined and specified, the imaging scale can be calculated (calibrated) from the image thereof on the sensor surface. The individual lighting elements (LEDs) of a position light can also be switched and activated separately for this purpose. The described calibration can be carried out at any time, automatically, and rapidly even immediately before beginning tamping work.

The inertia-free optical measurement axis instead of the steel cable is advantageous in this embodiment according to the invention. In addition, the optical axis is located in particular in the middle of the track, where it does not have an interfering effect in the region of the working units. Since there is no drift of a cable with system errors as in the case of steel cables and leveling encoders, the achievable measurement accuracy is substantially increased. Furthermore, the damage to the cables which frequently occurs during the transport and the equipping is dispensed with. The simultaneous capture of the orientation location, the vertical location, and the transverse inclination of the measurement carriages represents a further advantage. In addition, no offset displacements as a result of temperature occur if digital cameras are used, as is the case with the analog travel sensors which are otherwise generally used.

Figure 4:
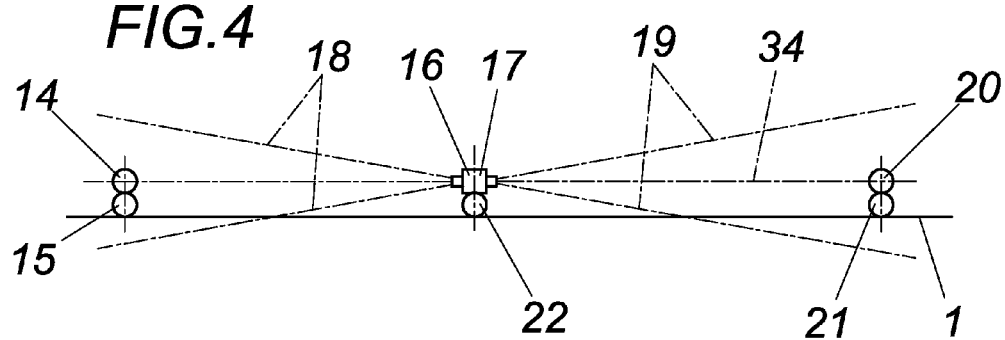
Figure 5:
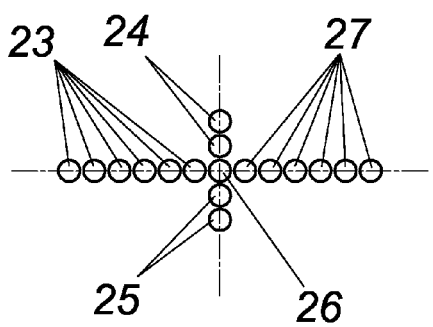
Figure 6:
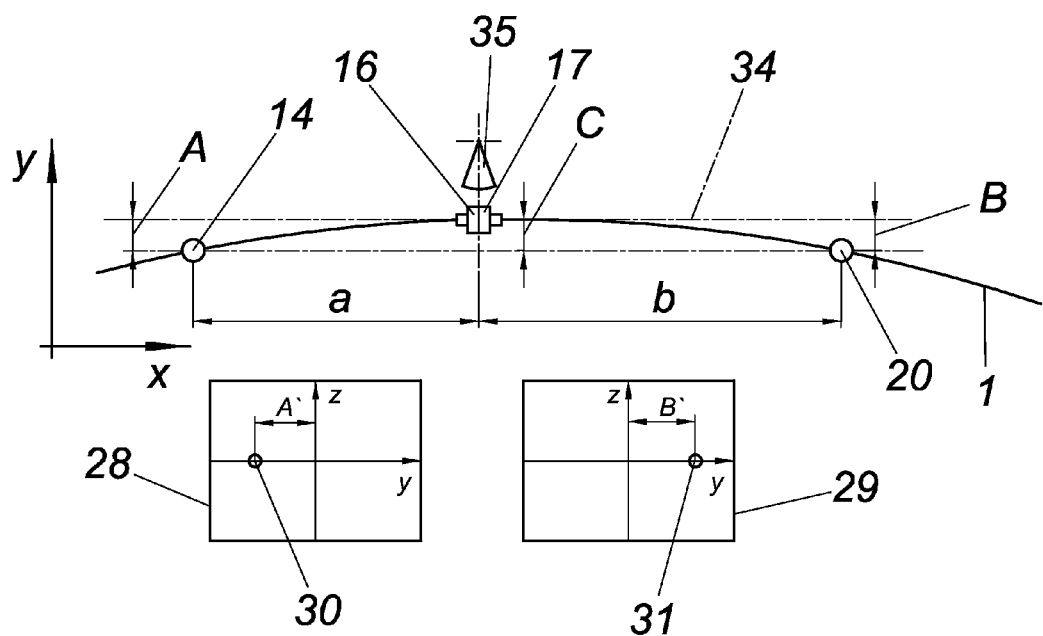
Figure 7:
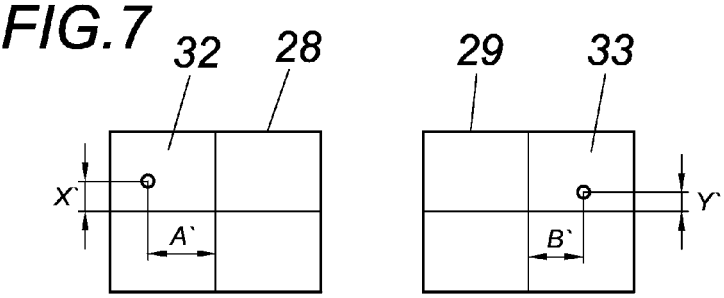
Figure 8:
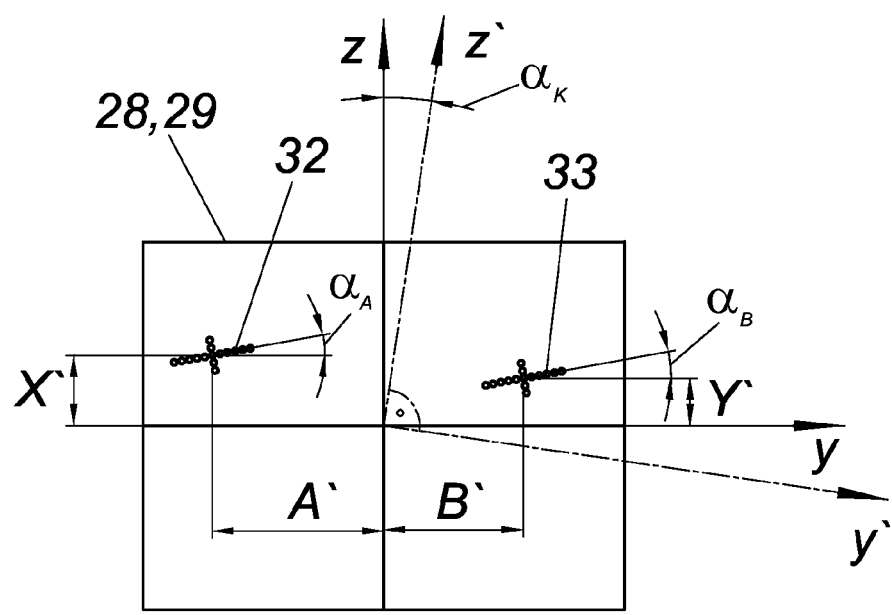

The subject matter of the invention is shown as an example in the drawing. In the figures:

FIG. 1 shows a measurement arrangement having stretched measurement cable and having measurement sensor for the track orientation according to the prior art in a top view, FIG. 2 shows a side view of the measurement arrangement according to FIG. 1, FIG. 3 shows a measurement arrangement according to the invention in a top view, FIG. 4 shows the measurement arrangement from FIG. 3 in a side view, FIG. 5 shows an embodiment according to the invention of the position lights, FIG. 6 shows the embodiment according to the invention having pendulum on the camera measurement carriage and having schematically illustrated camera images, FIG. 7 shows camera images during the simultaneous display of lateral and vertical deflection of the outer measurement carriages, and FIG. 8 shows an image composed of the two camera images from FIG. 7.

In measurement units having steel cable 3 according to the prior art (FIG. 1), two stretching carriages 2, 7 move in the track 1. The middle orienting measurement carriage 4 carries a distance meter 5, via which the deflection 6 of the steel cable 3 is measured. Stretching carriages 2, 7 and middle orienting measurement carriage 4 are preferably part of a track laying machine, in particular the lifting-orienting system. The setpoint deflection can be determined in dependence on the known track geometry. By way of comparison to the measured actual deflection 6, the track is moved via corresponding orienting assemblies into the setpoint location and fixed there by means of tamping.

In conventional measurement units having steel cable 13 for the track height (FIG. 2), two leveling carriages 8, 12 move in the track 1. A leveling encoder 10, which measures the vertical deviation 11, is located on the leveling carriage 9. By comparing the setpoint height to the actual height thus measured, the lifting assembly of the tamping machine is controlled so that the deviation is zero and the track is fixed in this position by tamping.

In an embodiment according to the invention for the orientation (FIG. 3), the outer two measurement carriages 15, 21, which are movable in the track, carry position encoders 14, 20, namely position lights or reflector strips. The middle camera measurement carriage 22 carries two cameras 16, 17 arranged on an optical axis 34, wherein one camera 16 is oriented to the rear toward the measurement carriage 14 and the other camera 17 is oriented to the front toward the measurement carriage 21. The image angle ranges (focal length of the objective) 18, 19 are selected such that the position lights 14, 20 for the cameras are still visible at the smallest track radius to be processed.

The track height (FIG. 4) is measured simultaneously. The schematic illustration shows the arrangement according to the invention from a lateral view.

FIG. 5 shows a possible arrangement of the position lights. The position lights could be embodied as high-power LEDs. In this case, for easier analyzing capability and for the plausibility check during the image analysis, the LEDs can be embodied as multicolored and switchable in color. The LED 23 could illuminate, for example, red/green, the LED 27 green/red, the middle LED 26 white/yellow, and the LEDs 24 and 25 yellow/white.

The arrangement according to the invention (FIG. 6) is shown in simplified form for the direction in track axis 1. In addition, a transverse inclination meter 35 is attached to the camera measurement carriage 22. The real deflections of the two outer position lights 14, 20 in relation to the camera positions 16, 17 are A and B. The coordinate axis x is defined in the track longitudinal direction, the track transverse direction is defined as the y axis, and the vertical axis is defined as the z axis. The outer position measurement carriages, which are embodied as track-traveling, are located at the distances a and b from the camera measurement carriage. Typically, a has a length between 4 and 6 m and b has a length between 8 and 12 m. The lateral deflections are up to 0.8 m from the track middle and the vertical deflections are up to 0.4 m from the middle location. The deflection of the cameras in relation to the imaginary connecting line of the two position lights then results as C. The two camera images 28, 29 show the position of the position lights 30, 31 on the display screen similarly with the distances A' and B'.

The following equation then results (with signs removed) for the position C of the cameras 16, 17 in relation to the connecting line of the two position lights 14, 20 (FIG. 7):

$$C = \frac{1}{a+b} \cdot (b \cdot A + a \cdot B)$$

wherein A and B are calculated as followed from the camera analyses and the imaging scale ($M_1$, $M_2$):

$$A = M_1 \cdot A'$$

$$B = M_2 \cdot B'$$

In the case of lateral and vertical deflection of the position lights (FIG. 7), the vertical deflection is also ascertained simultaneously to the lateral deflection as follows:

$$Z = \frac{1}{a+b} \cdot (b \cdot X + a \cdot Y)$$

wherein X and Y are analogously calculated as follows from the camera analyses and the imaging scale:

$$X = M_1 \cdot X'$$

$$Y = M_2 \cdot Y'$$

FIG. 8 shows the position lights 32, 33 from FIG. 7 in a simplified image 28, 29. The two position lights 32, 33 are now inclined by the angles $\alpha_A$ and $\alpha_B$ in relation to the camera axis as a result of the transverse inclination prevailing on the outer measurement carriage. To ascertain the real inclinations, the coordinate system is rotated with the aid of the measurement camera inclination $\alpha_K$. Therefore, by measuring the camera inclination, the absolute inclination $\alpha_A$ of the rear and front measurement carriages $\alpha_B$ can be ascertained.

The invention claimed is:

1. A device for measuring tracks for a track-laying machine having front and rear, track-traveling measurement carriages and a middle-track traveling measurement carriage arranged therebetween, said device comprising at least one position encoder pointing toward the middle measurement carriage and associated with each of the outer measurement carriages, and at least two optical sensors are arranged on the middle measurement carriage on an optical axis such that at least one optical sensor is oriented toward the rear measurement carriage and at least one other optical sensor is oriented toward the front measurement carriage.

2. The device according to claim 1, wherein the optical sensors are digital cameras.

3. The device according to claim 1, wherein the optical sensors are position-sensitive diode cameras.

4. The device according to claim 3, wherein the optical sensors are optical position sensors.

5. The device according to claim 1 wherein the position encoder or encoders each comprise a position light.

6. The device according to claim 5, wherein multiple position lights in a defined geometric arrangement are combined to form a lighting unit in each case.

7. The device according to claim 5 wherein the position lights have various light colors.

8. The device according to claim 7 wherein the light colors of the position lights are switchable.

9. The device according to claim 8 wherein the individual position lights of the position encoder or one of the position encoders are switchable and activatable independently of one another.

10. The device according to claim 1 wherein the position encoder or encoders are each a reflector that can each be irradiated by at least one light source.

11. The device according to claim 1 wherein the position encoders are light-emitting, and the light-emitting position encoders and the cameras are controlled such that the cameras alternately record images of light-emitting position encoders and images of the activated position encoders.

12. The device according to claim 1 wherein a transverse inclination meter is associated with at least one of the measurement carriages.

13. The device according to claim 1 wherein the position encoders are lighting units or reflectors, respectively.

14. The device according to claim 1, wherein the optical sensors comprise cameras.

* * * * *